No. 870,405.　　　　　　　　　　　　　PATENTED NOV. 5, 1907.
P. ZUCKRIEGEL.
MUSIC CHART.
APPLICATION FILED JAN. 12, 1907.
3 SHEETS—SHEET 1.
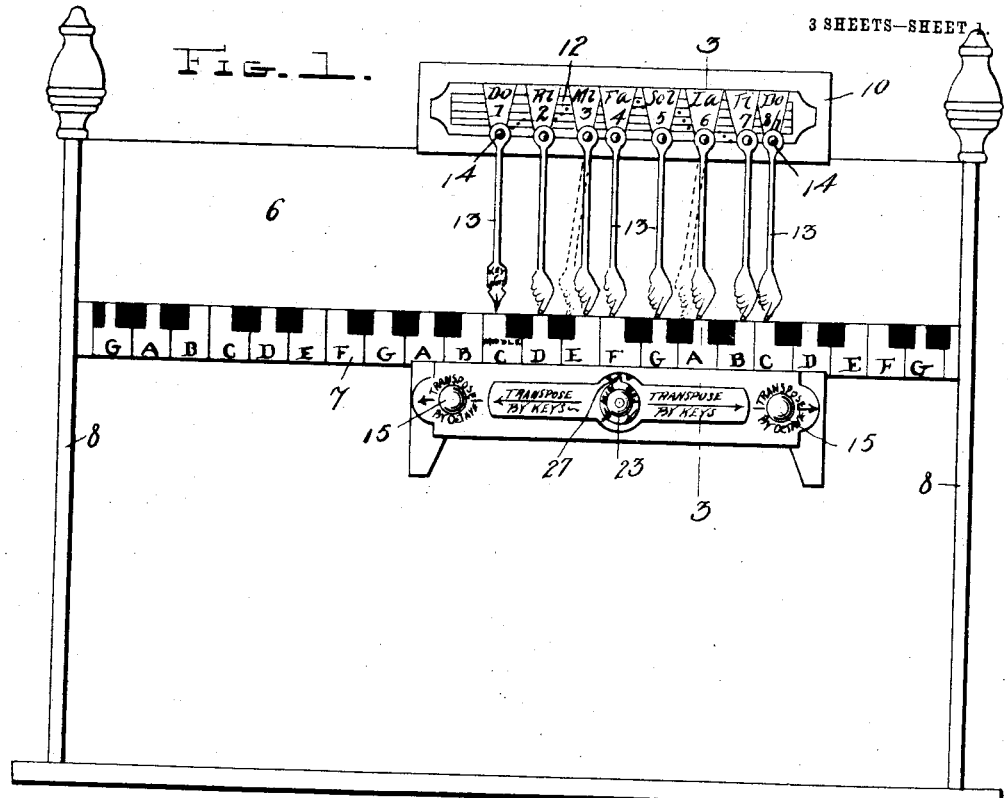
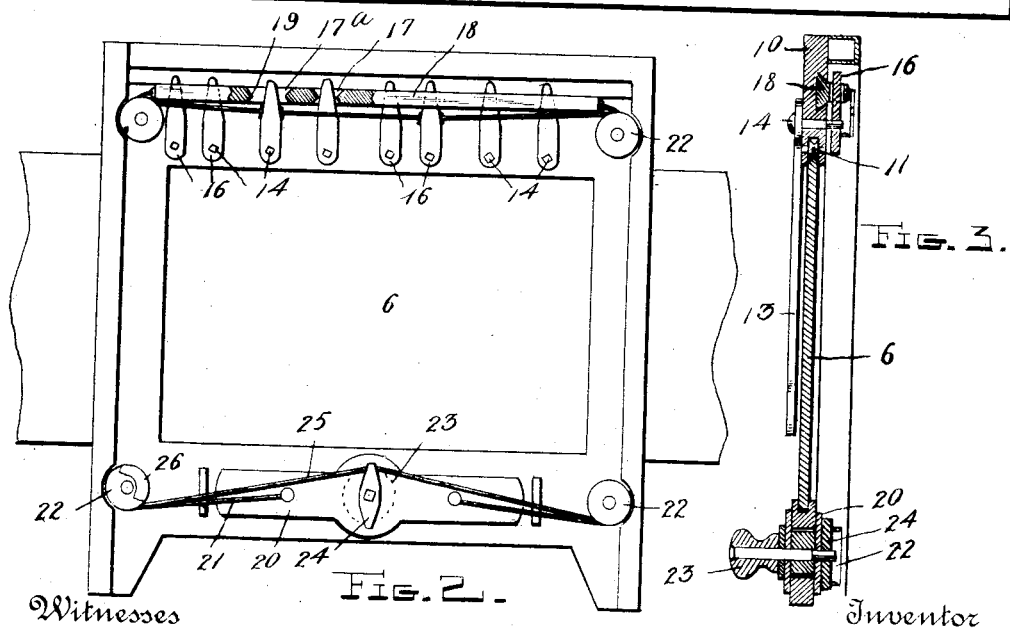
Witnesses　　　　　　　　　　　　　　　Inventor
Peter Zuckriegel
Attorneys
THE NORRIS PETERS CO., WASHINGTON, D. C.

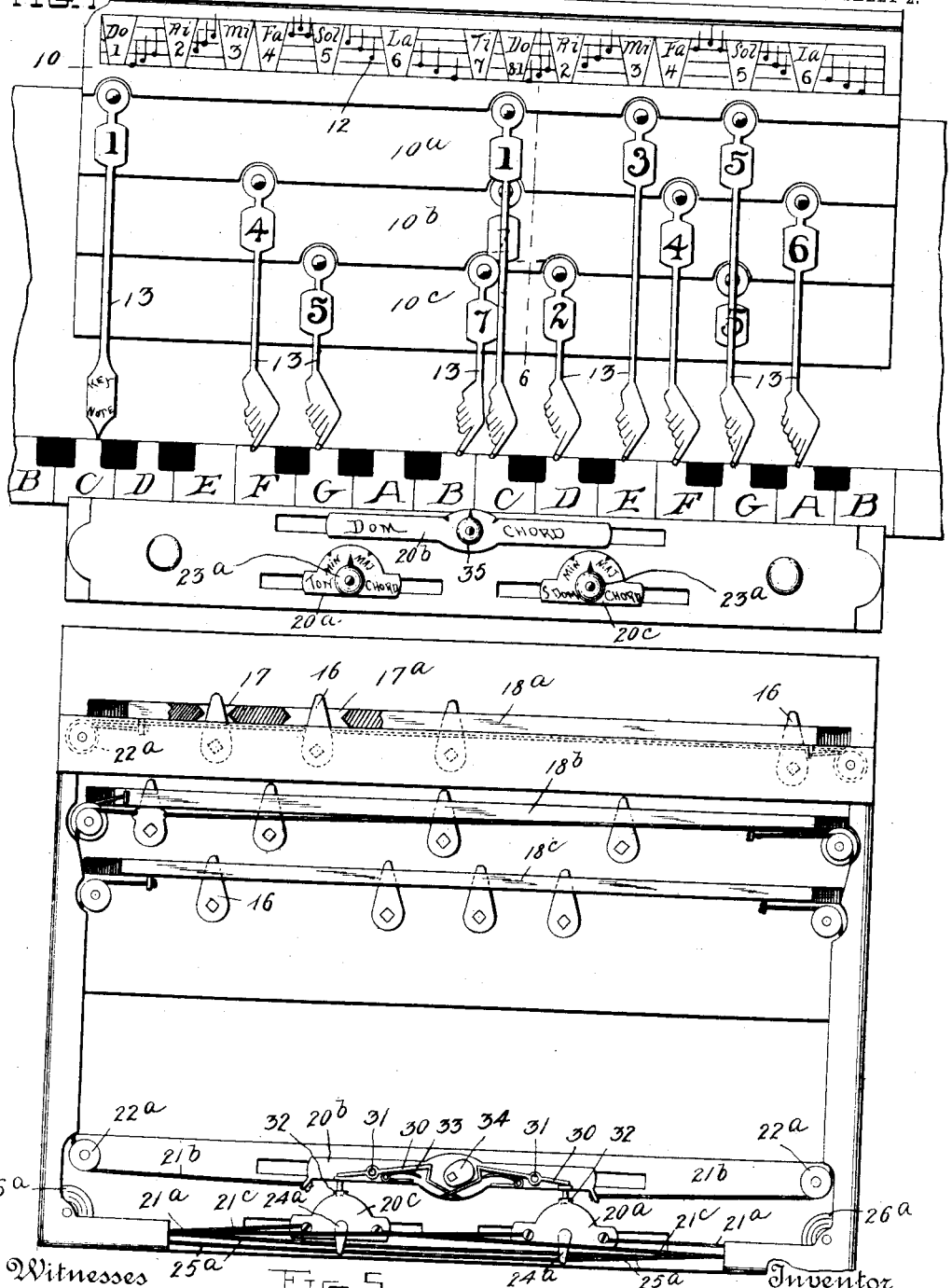

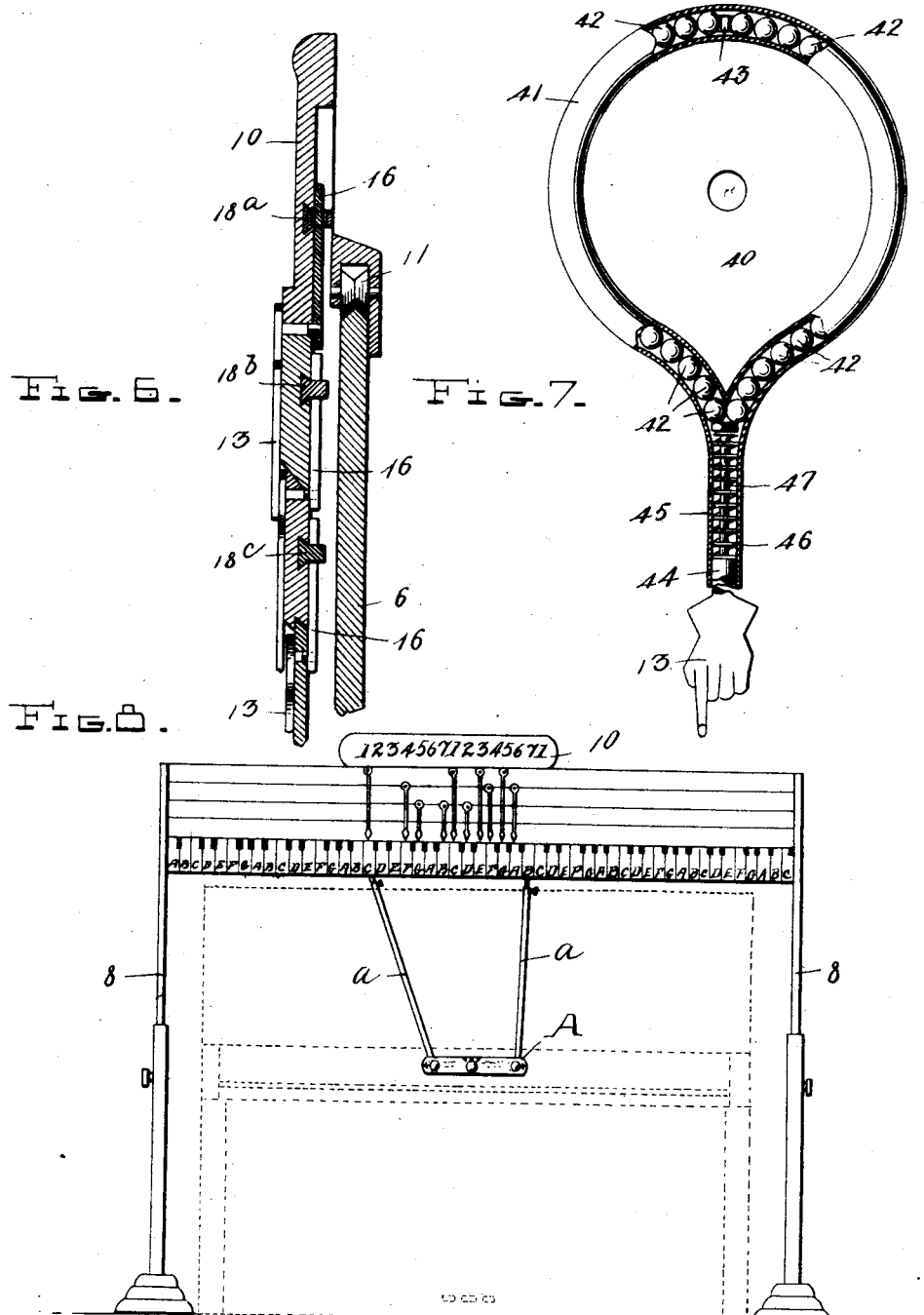

UNITED STATES PATENT OFFICE.

PETER ZUCKRIEGEL, OF CLEVELAND, OHIO.

MUSIC-CHART.

No. 870,405.  Specification of Letters Patent.  Patented Nov. 5, 1907.

Application filed January 12, 1907. Serial No. 352,011.

*To all whom it may concern:*

Be it known that I, PETER ZUCKRIEGEL, a citizen of the United States, residing at Cleveland, in the county of Cuyahoga and State of Ohio, have invented certain new and useful Improvements in Music-Charts, of which the following is a specification.

This invention relates to music charts, and particularly to what are known as transposition charts, and it is designed for the purpose of elucidating and teaching the principles of transposition and harmony by a graphic illustration effected by means of movable pointers and other devices acting in coöperation with the representation of a chromatic scale or key board.

The object of the invention is to produce an improved device of the kind, in which the different combinations in the science of harmony may be illustrated in every key of the octave by moving the swinging, pendulum like, indicators and to do so in both the major and minor keys, which latter may be quickly and graphically indicated by swinging the indicators of the third and sixth notes from natural to flat position and vice versa. Also to make like demonstration in different octaves by shifting the indicator carriage along the board on which the representation of the key board is displayed—which I will hereafter call the display board.

The invention also includes mechanism whereby the same principles are applied to chords, to illustrate the tonic, sub-dominant, and dominant chords, as well as the major and minor chords of the two former. Latches or connecting devices are provided whereby the manipulation and illustration for all of said chords may be simultaneously performed, as well as for each separately.

The apparatus is capable of use in connection with a piano, and may be constructed of such size and shape as to be seen from a distance and thus used to illustrate a lecture or explanation before a class or other audience.

The invention is hereinafter illustrated in connection with certain mechanical features which, however, may be varied in many ways without departing from the principle and scope of the invention.

In the drawings, Figure 1 is a front elevation of the apparatus in a form suitable for work before a class or audience, and showing simply the chart as used to illustrate transposition by octaves or keys. Fig. 2 is a rear elevation thereof. Fig. 3 is a vertical section on the line 3—3 of Fig. 1. Fig. 4 is a front elevation of the apparatus as constructed for the purpose of illustrating the chords of various kinds and shows three distinct divisions or parts which in the practical embodiment of the device will be differentiated by different colors, and indicate respectively the tonic, sub-dominant and dominant chords. Fig. 5 is a rear view of the parts shown in Fig. 4. Fig. 6 is a section on the line 6—6 of Fig. 4. Fig. 7 is a plan view, partly in section, of a modification designed for the purpose of lengthening or extending the indicators or pointers, as hereinafter explained. Fig. 8 is a front elevation of the apparatus as applied to a piano.

Referring specifically to Figs. 1, 2 and 3 of the drawings, 6 indicates what will hereafter be termed a display board, and this has, preferably at the lower edge thereof, an illustration of a key board, as indicated at 7. The display board is supported at its ends by standards 8 which if desired may be made extensible or adjustable, as shown in Fig. 8.

The indicator or slide carriage is indicated at 10, and it is mounted to slide sidewise on the display board, to which end it may be provided with rollers 11 which travel upon the top edge of said board.

The indicator carriage is provided at the top, upon the face thereof, with the representation of the notes of the scale, as indicated at 12, which may be represented by the numerals 1, 2, 3, 4, etc., or the names do, re, me, fa, etc., or both, and these numerals or names are arranged at distances apart corresponding to the distance apart of the keys illustrated on the display board below, half spaces being provided between the third and fourth and seventh and eighth notes, according to the steps of the ordinary major scale, as will be understood.

13 indicate the pointers or indicators one for each of the notes of the scale. These are pivotally hung at the upper end upon pivots 14 which extend through to the rear side of the carriage plate or frame. The lower ends of the pointers depend in front of the display board to position directly above the keys 7 printed thereon, and in the normal position to the natural or major scale.

Now, to illustrate transposition by octaves, it is simply necessary to slide the carriage along the display board to the necessary position to bring the first or key note pointer to the same key one or more octaves above or below. Buttons 15, attached to the carriage, may be taken hold of to do this conveniently.

The pivot pins 14 are connected on the rear or back side of the carriage to arms 16 which project through recesses 17 on the rear of a slide 18 set in a groove in the back of the carriage plate. The side walls of these recesses are beveled off or pointed as at 19 so as to give sufficient room for the lateral play or movement of the arms 16. Furthermore, the spaces which receive the arms connected to the pivots of the third and sixth pointers are enlarged as indicated at $17^a$, for the purpose of allowing the independent movement of those pointers incident to transposition from major to minor scales, as hereinafter described.

The slide 18 is connected at opposite ends to a slide 20 conveniently located at the bottom of the carriage plate and this slide has a limited lateral movement in either direction.

The connection between the opposite ends of the slide 18 and the slide 20 is effected by means of cords 21 which pass over pulleys 22 at the sides or ends of the carriage.

The slide 20 is provided at the front with a knob 23, for its convenient manipulation.

It is obvious that when the slide 20 is moved one way or the other it will, by means of its cord connections to the slide 18, cause the latter to move accordingly, and this motion will be transmitted by means of the arms 16 and pivots 14 to the pointers 13, and said pointers will swing so that instead of being directed toward the notes of the original key they will be directed toward the notes of the new key, either above or below the original key, as desired. The range of the swing is such that the transposition may be indicated to keys by half or whole tones to the extent of one half octave above or below the original key. Of course by shifting the whole carriage along the display board any other key in any other octave may be indicated. And all the pointers will swing the same distance or to the same extent so that the correct relation of the notes is preserved. This gives a graphic illustration of transposition by keys by simply moving the slide 20 one way or the other, or in addition by sliding the whole carriage to any desired position along the display board.

Illustration of major and minor scales involves flatting the third and sixth of the scale. To this end, the arms 16 of the third and sixth pointers are connected at the rear of the carriage plate to a lever 24 mounted upon the spindle of the knob 23, the connection being by means of cords 25 which pass over pulleys 26. The knob 23 has an index 27 to show whether the parts are set for major or minor position.

To transpose from major to minor the abutment 23 is turned to the left. This turns the lever 24 and by means of the cord connection 25 the arms 16 attached to the third and sixth pointers are swung, thereby shifting said pointers a half space or step to the left, as indicated in dotted lines in Fig. 1. The enlarged spaces 17$^a$ allow the necessary movement of the said arms 16 without moving or affecting the slide 18 or the other pointers.

It will be seen that by the apparatus above described transposition of all kinds may be effected and illustrated, with respect to all variations of both major and minor keys. An adaptation of the same principle for the chords of various kinds is illustrated in Figs. 4, 5 and 6. In this the carriage plate 10 in addition to containing the representation of the notes 12 of the scale has below the same a series of three sub-divisions or parts indicated respectively at 10$^a$, 10$^b$ and 10$^c$, and representing, respectively, the tonic, sub-dominant and dominant chords. These divisions, as well as the pointers thereof, in practice, will be further distinguished by different colors. The tonic sub-division, 10$^a$, carries the pointers indicating the first, third and fifth of the scale. The sub-dominant division, 10$^b$, carries the pointers of the first, fourth and sixth of the scale, and the dominant division carries those of the second, fifth and seventh of the scale; all the pointers being pivotally mounted, and having arms 16 as heretofore described. Three slides are provided on the rear of the carriage plate, indicated at 18$^a$, 18$^b$ and 18$^c$, for the three classes of chords respectively, and these slides are provided with openings 17 as before, and also with enlarged openings 17$^a$ for the third and sixth of the scale, to illustrate the minor chords, as before.

The manipulating devices for the chord apparatus include three slides, indicated at 20$^a$, 20$^b$, and 20$^c$ for the tonic, dominant and sub-dominant, respectively. These are severally connected by cords 21$^a$, 21$^b$ and 21$^c$, which pass over guide pulleys 22$^a$, to the respective slides 18$^a$, 18$^b$ and 18$^c$; consequently by moving any one of the slides 20$^a$, 20$^b$ or 20$^c$ the pointers for the corresponding chords are shifted to the right or left as the case may be to transpose the chord to the different key as desired.

It is ordinarily desirable to transpose all the chords together or at the same time, and to this end the slides 20$^a$, 20$^b$ and 20$^c$ are normally connected together by means of latches consisting of levers 30 which are pivoted at 31 to the slide 20$^b$ and which engage at their ends in sockets 32 formed respectively in the slides 20$^a$ and 20$^c$. Springs 33 normally hold the latches closed, so when one slide is moved they are all moved. But to shift one slide and not the others the latches may be lifted by means of a cam 34 carried by the spindle of the knob 35 on the front of the slide 20$^b$.

For the inner tonic and sub-dominant chords, the corresponding slides 20$^a$ and 20$^c$ are each provided with a lever 24$^a$ projecting from the spindle of the button 23$^a$, and these levers are respectively connected by cords 25$^a$, which pass over pulleys 26$^a$, to the arms 16 of the third and sixth pointers; and by turning either of the buttons 23$^a$ the said pointers are flatted a half note in the same manner as heretofore described.

It is obvious that under some conditions the display board with indicator carriage should be placed at sufficient height to be seen over the heads of others, and that the manipulating device at the bottom of the carriage 10 must accordingly be lowered and this is to be done by means of hollow tubes as indicated by $a$ in Fig. 8. Thus the manipulating device instead of being located on the carriage as shown in Figs. 1 and 4, is lowered by means of said tubes and through these tubes the cords will pass which form the connection between the manipulating parts. The tubes are connected to the lower corner of the carriage 10 and then telescoped to meet the manipulator plate as indicated, as a whole, at A in Fig. 8. With this arrangement a piano may be placed directly under the display board and close in the rear of the manipulator, as shown, as a whole in Fig. 8. Thus, the teacher from his seat can manipulate the chart above and sound the piano accordingly and so demonstrate the matter to both the eye and the ear. On the event of using the apparatus without a piano, the standards may be dispensed with and other means of suspending the board may be adopted, to the wall for instance, by means of brackets.

In Fig. 7, I illustrate means for lengthening or shortening the pointers 13. It will be appreciated that when one of the pointers swings to different keys, the farther it swings the more it will get away from the level of the representation of the key board, and thus it will be some little distance from the key at which it aims to point. To overcome this and to keep the end of the pointer directly on the key at which it aims an extension pointer is provided, consisting of a plate 40 carrying a hollow tube 41 at its rim in which is placed a series of balls 42 which are held in position at the top by a pin 43 projecting from the carriage plate and into the tube. The bar 44 of the pointer works in a tube 45 and has at the inner end a spring 46 coiled around a rod 47. The spring normally retracts the pointer to the extent permitted by the tube 45, but when the plate 40 is turned the pin 43 will push the balls on one side or the other against the end of the rod 47 and will push out the bar 44 accordingly, thus lengthening the pointer according to the degree of swing and keeping the same in touch with the key at which it is aimed, so that there will be no uncertainty as to the key indicated.

Various other modifications of the principle of the invention may be made, within the scope of the accompanying claims.

I claim:

1. A music chart, comprising a board upon which the representation of a key-board is displayed, a carriage movable along the same, pointers supported on the carriage, and movable laterally relative to the carriage to indicate different keys, and a slide mounted on the carriage and connected to the pointers, to shift the same.

2. A music chart, comprising a board upon which the representation of a key-board is displayed, a carriage movable along the same, pointers carried thereby, for the keys said pointers being movable relative to the carriage, and means to shift some of the pointers without shifting the others, to indicate different scales.

3. A music chart, comprising a board upon which the representation of a key-board is displayed, a carriage movable along the same, pointers mounted on the carriage and movable laterally relative to the carriage to indicate different keys, and means to shift all of the pointers simultaneously, to indicate the keys of different scales, including a slide mounted on the carriage and connected to the pointers.

4. A music chart, comprising a board upon which the representation of a key-board is displayed, a carriage movable along the same, a set of pointers pivoted to the carriage and indicating the keys of the board, the pointers being movable to indicate different keys, and a slide movable on the carriage and connected to the pointers, to move the same.

5. A music chart, comprising a board upon which the representation of a key-board is displayed, a carriage movable along the same, a set of pointers pivoted to the carriage, and means connected to the pointers to simultaneously shift the same, to indicate transposition.

6. A music chart, comprising a board having the representation of a key-board thereon, a carriage movable along the board, pointers on the carriage, pointing to the keys said pointers being movable relative to the carriage, means connected to the pointers to move all of the same, and means to move selected pointers independently.

7. A music chart, comprising a board having the representation of a key-board thereon, a carriage slidable along the board, pointers corresponding to the notes of the scale and pivoted on the carriage and arranged to indicate the keys, and having arms projecting therefrom, a slide on the carriage, having recesses into which the arms project, some of said recesses being enlarged, means to shift the slide, to swing the pointers, and means to independently swing the pointers having arms in said enlarged recesses.

8. A music chart comprising a board having thereon the representation of a key-board, a carriage movable along the board and divided into separate parts related respectively to different chords, and key pointers attached to the carriage, said pointers being divided into groups according to the chords, the pointers of each group being attached to the respective part.

9. A music chart, comprising a board having thereon the representation of a key-board, a carriage movable along the board and having separate parts related to different chords, movable key pointers attached to the carriage, said pointers being divided into groups according to the chords, the pointers of each group being attached to the respective part, and devices to move the pointers of each of the parts to indicate different keys.

10. A music chart, comprising a board having thereon the representation of a key-board, a carriage movable along the board and divided into separate parts related respectively to different chords, movable key pointers attached to the carriage, said pointers being divided into groups according to the chords, the pointers of each group being attached to the respective part, devices to move the pointers of each of the parts to indicate different keys, and means to connect said devices together, to move the pointers of all of the parts simultaneously.

11. The combination of a chart having thereon the representation of a key-board, transposition indicators movable thereon, a manipulating device located at a distance from the said chart and indicators, to operate the latter, adjustable supports between the chart and said device, and connections between said device and the indicators.

In testimony whereof I affix my signature, in presence of two witnesses.

PETER ZUCKRIEGEL.

Witnesses:
JOHN A. BOMMHARDT,
SHIRLEY J. BOMMHARDT.